July 1, 1952     L. E. HARRIS     2,601,869
TANK FOR DELIVERING MEASURED VOLUMES OF LIQUID
Filed July 21, 1951
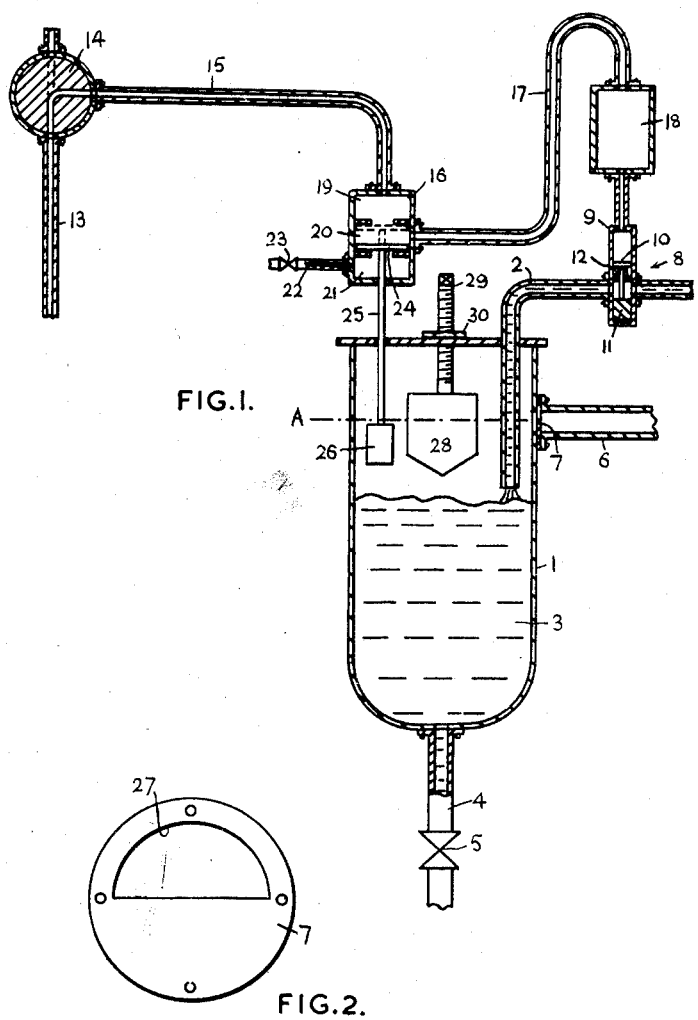
Inventor
Leslie Ewart Harris
By Fetherstonhaugh & Co.
Attorneys Patented July 1, 1952

2,601,869

UNITED STATES PATENT OFFICE 2,601,869

TANK FOR DELIVERING MEASURED VOLUMES OF LIQUID

Leslie Ewart Harris, Cornwall, Ontario, Canada

Application July 21, 1951, Serial No. 237,879
In Great Britain June 7, 1950

2 Claims. (Cl. 137—413)

This invention relates to tanks for measuring volumes of liquid, in particular for use in the production of viscose for the delivery to the churn of measured quantities of sodium hydroxide solution.

Such tanks are known comprising a chamber with a weir for allowing overflow of liquid surplus to the required volume. Normally an inlet is provided with a manually or automatically controlled valve for shutting off the supply when the level of the liquid in the chamber rises to the level of the weir but difficulties are met in ensuring that the supply is cut off at a suitable moment and not just a little too soon or too late.

It is the object of the present invention to permit a slow closing of the inlet to ensure a smooth termination to the filling of the chamber.

According to the present invention a tank for delivering a measured volume of liquid comprises a chamber with a weir for allowing overflow of liquid surplus to the required volume, a delivery outlet, and an inlet valve opened pneumatically by air supplied through a pilot valve operated by a float suspended in the chamber wherein a slow closing of the inlet valve follows from the provision between the pilot valve and the inlet valve of a pressure reservoir from which the air exhausts slowly after the closing of the pilot valve.

Preferably the pilot valve forms part of a three port valve permitting supply of air to the pressure reservoir and inlet valve and alternatively the stopping of the air and the exhaustion of the air from the pressure reservoir.

The present invention also includes a combination of a churn for use in the production of viscose and a tank for supplying the measured volumes of liquid as described in either of the two preceding paragraphs.

In a specific example of the present invention, apparatus for measuring a predetermined volume of sodium hydroxide solution comprises a tank having an inlet pipe, an outlet pipe, a weir and a float which is connected by a rod to a piston in a three port pilot valve. Sodium hydroxide solution is delivered from a stock supply to the tank by the inlet pipe which has a pneumatically operated inlet valve requiring an air pressure of about 20 p. s. i. to maintain a fully open position. The pilot valve has an inlet port, an outlet port and a vent. The inlet port is connected to an external compressed air source and when the piston is in a lowered position the air pressure is transmitted through the outlet port to a pressure reservoir of 60 cubic inches, and from the reservoir to the pneumatically operated inlet valve.

As the level of the sodium hydroxide solution in the tank rises toward the weir, the float lifts and consequently the piston within the pilot valve is moved upwards so that eventually it seals the inlet port, cutting off the air supply, and connects the outlet port to the vent. The compressed air within the reservoir exhausts through the vent, slowly releasing the pressure on the pneumatically operated inlet valve so that the flow of sodium hydroxide solution to the tank is gradually cut off over a period of 15–20 seconds. At this stage, sodium hydroxide solution in excess of the measured volume in the tank is passing over the weir. The measured volume of solution is then allowed to pass to a churn, in which viscose is produced, by the manual operation of a valve in the outlet pipe.

One example of a sodium hydroxide measuring tank constructed in accordance with the present invention is illustrated in the accompanying drawings in which Figure 1 is a vertical section of the tank during the filling operation and Figure 2 is a front elevation of the weir plate.

Referring to Figure 1, a tank 1 is fitted with an inlet pipe 2 for delivering sodium hydroxide solution 3 from a storage tank (not shown), an outlet pipe 4 fitted with a valve 5, and an overflow pipe 6 fitted with a weir plate 7. The inlet pipe 2 is fitted with a pneumatically operated valve 8 which is normally closed but is opened when supplied with air at a pressure of approximately 20 pounds per square inch. The pneumatically operated valve 8 comprises a cylinder 9 having a piston 10 connected to a sliding plug 11 which is normally held by a spring 12 in a position where it stops the flow of solution 3 through the inlet pipe 2, that is to say in a position above that shown in Figure 1. To open the valve 8 for the supply of caustic soda solution 3 air under pressure of approximately 20 pounds per square inch is supplied to the valve 8 from a source (not shown) by an air pipe 13 through a control valve 14, a second air pipe 15, a float operated, three port, pilot valve 16, a third air pipe 17 and a pressure reservoir 18, the plug 11 then occupying the position shown in Figure 1.

The controlling valve 14 has two positions. In one position air under pressure is admitted to the pipe 15 and in the second position the pipe 15 is open to the atmosphere. The pilot valve 16 has three communicating chambers 19, 20, 21. The upper chamber 19 is connected with the pipe 15 and the lower chamber 21, is connected with the atmosphere through a vent 22, the aperture of which may be controlled by a valve 23. The central chamber 20 is connected to the pipe 17 and a piston 24, connected by a rod 25 to a float 26 in the tank 1, can move within the central chamber 20 so that in its lower position, the chamber 21 is sealed and the pipe 17 is in communication with the pipe 15, and in its upper position (shown in Figure 1 in dotted outline) the chamber 19 is sealed and the pipe 17 is in communication with the atmosphere through the vent 22. The float 26 is located in the tank 1 so that it is lifted by the rising level of the sodium hydroxide solution 3 just before the measured volume has been delivered.

The wier plate 7 (Figure 2) consists of a disc having a D-shaped cut out 27. When the level of solution 3 reaches the plate 7, the tank 1 contains the required measured volume and any excess passes through the cut-out 27 and returns to the storage tank by the way of the pipe 6 The measured volume may be corrected over a small range by means of a reservoir displacement float 28 mounted on a screw 29 from the top of the tank 1. The float 28, which is partly immersed in the solution 3 when the tank 1 is full, may be moved in a vertical plane by a nut 30 on the screw 29.

At the commencement of the filling operation, the valve 5 is closed and the piston 24 of the pilot valve 16 will be at its lowest position. The control valve 14 is turned so that air at a pressure of 20 pounds per square inch is admitted to pipe 15 to open the inlet valve 8 through the pilot valve 16, the pipe 17 and the reservoir 18. Sodium hydroxide solution 3 will now enter the tank 1 through the pipe 2 and as the level of liquid approaches the plate 7, the float 26 will be lifted and the piston 24 will move up in the pilot valve 16 and hence will shut off the air supply through the pipe 15. Air under pressure is trapped in the pilot valve chamber 20, 21, the pipe 17 and the reservoir 18 and is slowly exhausted through the vent 23. The reservoir 18 may conveniently have a capacity of about 60 cubic inches so that about 15 to 20 seconds elapse before exhaustion is complete. As the air pressure in the reservoir 18 decreases, the valve 8 slowly closes the inlet pipe 2 so that the flow of solution 3 is gradually cut off also over a period of 15 to 20 seconds. During the cutting-off period, the turbulence of the solution in the tank 1 subsides so that on completion the level of the solution 3 (shown by the chain line A) is smooth and the excess solution passes over the weir plate 7 into the pipe 6. The tank 1 now contains the measured quantity of solution 3.

The solution 2 may be discharged from the tank 1 by turning the valve 14 to the position which opens pipe 15 to the atmosphere and opening valve 5. As the tank 1 empties, the float 26 and the piston 24 will drop to their lower positions in preparation for the next filling cycle.

The measuring tank is of particular use in viscose production, when volumes of sodium hydroxide solution, water and carbon disulphide are separately measured in tanks constructed in accordance with the present invention. At the response of an automatic control, the measured quantiites of the solution pass in turn and at determined intervals to a churn containing alkali cellulose. As the viscose is processed, the measuring tanks are refilled in preparation of the next batch cycle.

I claim:

1. Apparatus for delivering measured volumes of liquid comprising a tank, an overflow weir over which surplus liquid is discharged from the tank, an inlet valve through which liquid is supplied to the tank, means normally biasing said inlet valve to closed position, a normally closed outlet through which liquid is discharged from said tank, an air motor for operating the inlet valve to open position, a pressure reservoir through which air is alternately supplied to and exhausted from said air motor to control the opening and closing of said inlet valve, a pilot valve through which air is alternately supplied to and exhausted from said pressure reservoir, said pilot valve being operable to a position in which air is supplied to said reservoir through said pilot valve to effect opening of said inlet valve or to a second position in which the air supply to the pressure reservoir is cut off and the air previously supplied to said reservoir is slowly exhausted through a restricted exhaust vent of the pilot valve to permit a slow return of the inlet valve to its closed position shutting off the supply of liquid to the tank and a pilot valve operating float connected to the pilot valve and suspended in the tank so that, during the filling of the tank, the float operates the pilot valve to a position shutting off the air supply to said reservoir when the liquid in the tank reaches a predetermined level located below the level of the overflow weir, the discharge area of the said exhaust vent of the pilot valve being so related to the volume of the air inlet motor chamber and said pressure reservoir as to give a predetermined time of closing of the inlet valve which enables the liquid level in the tank to be raised up to at least the level of the overflow weir between the closing of the pilot valve to shut off the supply of air to the pressure reservoir and the complete closure of the inlet valve.

2. Apparatus as claimed in claim 1, wherein the pilot valve forms part of a three port valve permitting supply of air to the pressure reservoir and inlet valve and, alternately, the stopping of the air supply and the exhaust of the air from the pressure reservoir.

LESLIE EWART HARRIS.

No references cited.